(12) United States Patent
Qiu et al.

(10) Patent No.: US 12,401,270 B2
(45) Date of Patent: Aug. 26, 2025

(54) PFC OPTIMIZATION ARCHITECTURE FOR AC INPUT AC/DC SWITCHING MODE POWER SUPPLIES

(71) Applicant: Infineon Technologies Canada Inc., Ottawa (CA)

(72) Inventors: Yajie Qiu, Kanata (CA); Xuechao Liu, Kanata (CA)

(73) Assignee: Infineon Technologies Canada Inc., Ottawa (CA)

( * ) Notice: Subject to any disclaimer, the term of this patent is extended or adjusted under 35 U.S.C. 154(b) by 253 days.

(21) Appl. No.: 17/942,672

(22) Filed: Sep. 12, 2022

(65) Prior Publication Data

US 2023/0110761 A1  Apr. 13, 2023

Related U.S. Application Data

(60) Provisional application No. 63/253,592, filed on Oct. 8, 2021.

(51) Int. Cl.
*H02M 1/42* (2007.01)
*H02M 3/335* (2006.01)

(52) U.S. Cl.
CPC ....... *H02M 1/4225* (2013.01); *H02M 1/4266* (2013.01); *H02M 3/33507* (2013.01)

(58) Field of Classification Search
CPC .... H02M 1/4225; H02M 1/4266; H02M 1/42; H02M 1/4208
See application file for complete search history.

(56) References Cited

U.S. PATENT DOCUMENTS

| | | | | |
|---|---|---|---|---|
| 10,158,282 B1 * | 12/2018 | Maruyama | .......... | H02M 1/4225 |
| 10,389,233 B1 * | 8/2019 | Lim | .................... | H02M 1/4225 |
| 11,108,329 B1 * | 8/2021 | Sigamani | ............ | H02M 1/4225 |
| 11,374,489 B2 | 6/2022 | Qiu et al. | | |
| 11,431,261 B2 | 8/2022 | Qiu et al. | | |
| 2007/0081364 A1 * | 4/2007 | Andreycak | ............. | H02M 1/42 363/17 |
| 2017/0317594 A1 * | 11/2017 | Lind | ....................... | H02M 1/36 |
| 2018/0367030 A1 * | 12/2018 | Lethellier | ........... | H02M 1/4241 |

* cited by examiner

*Primary Examiner* — Alex Torres-Rivera
(74) *Attorney, Agent, or Firm* — WORKMAN NYDEGGER

(57) ABSTRACT

An AC input AC/DC Switching Mode Power Supply (SMPS) with Power Factor Correction (PFC) comprises a boost follower circuit (BFC), a hybrid bulk capacitance circuit (HBCC) and driver and control circuitry. The BFC senses the peak AC input voltage and adjusts a PFC output voltage Vdc dependent on the AC input voltage, to improve low line efficiency and reduce losses. The BFC may provide a stepless or step regulation mode to follow the AC input line voltage. The driver and control circuitry coordinates operation of the BFC and HBCC. The driver and control circuitry comprises comparator circuitry, which enables selective connection of bulk capacitors of different voltage ratings, responsive to a sense voltage from the BFC, to meet requirements for ripple voltage and hold-up times for different Vdc. This solution provides a reduction in capacitor height and volume, with associated improvement in the power density of an isolated AC/DC power supply.

10 Claims, 10 Drawing Sheets

Hold-up time $$C_o \geq \frac{2 \cdot P_o \cdot t_{hold}}{V_o^2 - V_{o.min}^2}$$

Ripple voltage $$C_o \geq \frac{P_o}{2 \cdot \pi \cdot f_{line} \cdot \Delta V_o \cdot V_o}$$

when AC input is low line (< 160Vac):
 Q4 on, DC bus voltage $V_{DC}$=230V,
 $C_{BUS}=C_{BUS\_LV}+C_{BUS\_HV}$ when AC input is high line (> 180Vac):
 Q4 off, DC bus voltage $V_{DC}$=380V,
 $C_{BUS}= C_{BUS\_HV}$ Hysteresis control is required for switching Q3 (to control $R_{lowside}$) and Q4

When AC line input is low (< 160Vac):
Q3 off, Q4 on, DC bus voltage $V_{DC}$=230V,
$C_{BUS}=C_{BUS\_HV} + C_{BUS\_LV}$ When AC line input is high (> 180Vac):
Q3 on, Q4 off, DC bus voltage $V_{DC}$=380V,
$C_{BUS}= C_{BUS\_HV}$ Simulation results (step regulation mode)

small deadtime required between switching of Q4 and Q3 when AC line input is high (> 180Vac):
Q3 on, Q4 off, Vbus=380V,
$C_{BUS}= C_{BUS\_HV}$ when AC line input is low (< 160Vac):
Q3 off, Q4 on,
Vbus=230V,
$C_{BUS}=C_{BUS\_HV} +C_{BUS\_LV}$ Q3 is kept off to keep the LV Bus voltage reference
Q4 is always on to enable the LV bus cap $$C_o \geq \frac{2 \cdot P_o \cdot t_{hold}}{V_o^2 - V_{o,min}^2} \qquad C_o \geq \frac{P_o}{2 \cdot \pi \cdot f_{line} \cdot \Delta V_o \cdot V_o}$$

Hold-up time        Voltage ripple

| Vin=230V, Vpfc=380V add boost follower | |
|---|---|
| Po | 100W |
| t_hold | 16.6ms |
| Vbus | 380V |
| Vbus,min | 190V |
| fline | 50Hz |
| ΔVpfc | 18V |
| | |
| Co_1_holdup | 31uF |
| Co_2_ripple | 46.5uF |
| | |
| Co_requirement | 46.5uF |
| Co_practical | 47uF |

52% voltage drop allowed

8% voltage ripple allowed

Solution 1:
82µF rated for HV (450V)

| Vin=110V, Vpfc=230V add boost follower | |
|---|---|
| Po | 100W |
| t_hold | 16.6ms |
| Vbus | 230V |
| Vbus,min | 110V |
| fline | 50Hz |
| ΔVpfc | 18V |
| | |
| Co_1_holdup | 82uF |
| Co_2_ripple | 77uF |
| | |
| Co_requirement | 82uF |
| Co_practical | 82uF |

Example solution for SMPS with BFC: capacitor(s) rated at 450V

Fig. 12

| Vin=230V, Vpfc=380V add boost follower | |
|---|---|
| Po | 100W |
| t_hold | 16.6ms |
| Vbus | 380V |
| Vbus,min | 190V |
| fline | 50Hz |
| ΔVpfc | 18V |
| | |
| Co_1_holdup | 31uF |
| Co_2_ripple | 46.5uF |
| | |
| Co_requirement | 46.5uF |

52% voltage drop allowed

8% voltage ripple allowed

Solution 2:
47µF rated for HV (450V)
+
47µF rated LV (250V)

| Vin=110V, Vpfc=230V add boost follower | |
|---|---|
| Po | 100W |
| t_hold | 16.6ms |
| Vbus | 230V |
| Vbus,min | 110V |
| fline | 50Hz |
| ΔVpfc | 15V |
| | |
| Co_1_holdup | 82uF |
| Co_2_ripple | 92uF |
| | |
| Co_requirement | 92uF |

Example solution for SMPS with BFC: HV capacitor rated at 450V and LV capacitor rated at 250V

Fig. 13

Example: BOM and volume reduction for AC input AC/DC SMPS
with Boost PFC, BFC with HBCC

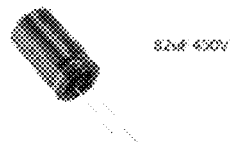

| Solution 1 | Cap. Spec | | Part no. | D(mm) | H(mm) | R(mm) | V(mm³) | Unit price |
|---|---|---|---|---|---|---|---|---|
| | 82µF | 450V | UCY2W820MHD6 | 18 | 33 | 9 | 8397.5 | 2.66473 |

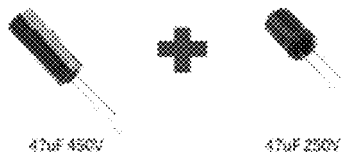

| Solution 2 | Cap. Spec | | Part no. | D(mm) | H(mm) | R(mm) | V(mm³) | Unit price |
|---|---|---|---|---|---|---|---|---|
| | 47µF | 450V | UCP2W470MHD | 12.5 | 33.5 | 6.25 | 4111 | 1.72389 |
| | 47µF | 250V | UCS2E470MHD1TO | 12.5 | 21.5 | 6.25 | 2638.5 | 0.5625 |

Fig. 14

| | Total volume (mm³) | D(mm) | Total price |
|---|---|---|---|
| Solution 1 | 8397.5 | 18 | 2.66473 |
| Solution 2 | 6749.5 | 12.5 | 2.58639 |
| Difference | 1648 | 5.5 | 0.08 |
| % Reduction | 19.60% | 30.50% | 3% |

Est. cost includes additional sense and control circuit cost @$0.3CAD
Cost based on 1kpcs/yr >19% bulk capacitor volume
>30% diameter reduction
>3% total cost reduction
Low line efficiency increased by boost follower circuit

Fig. 15

PFC OPTIMIZATION ARCHITECTURE FOR AC INPUT AC/DC SWITCHING MODE POWER SUPPLIES

CROSS-REFERENCE TO RELATED APPLICATION(S)

This application claims priority from U.S. provisional patent application No. 63/253,592, filed Oct. 8, 2021, entitled "PFC Optimization Architecture for AC Input AC/DC Switching Mode Power Supplies"

This application is related to U.S. patent application No. 63/161,558, filed Mar. 16, 2021, entitled "Architecture for Multi-Port AC/DC Switching Mode Power Supply", which is incorporated herein by reference in its entirety. This application is related to U.S. patent application Ser. No. 17/230,390, filed Apr. 14, 2021, entitled "Hybrid Bulk Capacitance Circuit for AC Input AC/DC Switching Mode Power Supplies", which is a continuation-in-part of U.S. patent application Ser. No. 17/070,309 entitled "Hybrid Bulk Capacitance Circuit for AC/DC Charger", filed Oct. 14, 2020, which claims the benefit of U.S. Provisional Patent Application No. 62/946,563 entitled "Hybrid Bulk Capacitance Circuit for AC/DC Charger", filed Dec. 11, 2019; all of which are incorporated herein by reference in their entirety.

TECHNICAL FIELD

This invention relates to switching mode power supplies (SMPS), and more particularly to AC input AC/DC SMPS with Power Factor Correction (PFC).

BACKGROUND

There is demand for SMPS comprising AC/DC converters, such as Universal AC input AC/DC adapters that are compact, lightweight, and efficient, and which are powerful enough for rapid charging of one or several smartphones, tablets, laptops, and other personal electronic devices.

Universal AC input AC/DC power adapters are designed to operate over a wide range of AC input voltages, typically between 90 Volts AC and 264 Volts AC for adapter applications and between 100 Volts AC and 305 Volts AC for industrial lighting applications, so that they are applicable worldwide. Low power AC/DC adapters with USB ports are now widely used for charging many types of small portable electronic devices. Adapters with USB Type-A (USB-A) ports are typically limited to ≤30 W. Adapters with USB Type-C (USB-C) ports can be used for >30 W. The output power depends on the load. For example, a smartphone may require 30 W, while a larger device such as a laptop may require a USB-C port providing at least 65 W for rapid charging.

Various industry standards are applicable to USB Power Delivery (PD) adapters, e.g. IEC61000-302; IEC 62368-1 and EN55032, et al. For example, for power adapters having a maximum rated power above 75 W, power factor correction (PFC) is required by various power delivery standards. Standards also place limits on total harmonic distortion (THD), electromagnetic compatibility (EMC), safety requirements, et al.

Although low power adapters, e.g. 30 W phone chargers and 65 W laptop chargers do not need PFC, if it is desired to provide an output 75 W, e.g. a 100 W multi-port charger capable of charging both a phone and a laptop, the applicable standards must be met, including the requirement for PFC. PFC improves power factor and low total harmonic distortion (THD) for higher power outputs. However, there are transistor, diode, and PFC inductor losses on the PFC stage, and these significantly reduce efficiency when the PFC is used for lower power applications, e.g. ≤30 W, and for low line AC inputs. For Universal AC input SMPS, bus capacitors must be rated for high line AC inputs, e.g. bus capacitors are rated for 450V, which requires higher, larger, more expensive capacitors, which occupy a large volume.

Thus, there is a need for improvements to AC/DC SMPS, such as universal AC input multi-port USB AC/DC PD adapters, e.g. to provide improved efficiency for operation at different AC line input voltages, and to provide improved power density.

SUMMARY OF INVENTION

The present invention seeks to provide an improved or alternative architecture for an AC input AC/DC SMPS.

Disclosed herein is an architecture for an AC input AC/DC Switching Mode Power Supply (SMPS) comprising: a first stage comprising a non-isolated AC/DC converter comprising a power factor correction (PFC) stage which receives an AC input voltage (VAcin) and provides a DC bus voltage Vdc; and a PFC controller; a second stage comprising an isolated DC/DC converter, the DC/DC converter which receives Vdc and provides an output voltage (Vo); and a converter controller; a Boost Follower Circuit (BFC) for regulating Vdc based on the peak AC input voltage, a Hybrid Bulk Capacitance Circuit (HBCC) comprising a plurality of capacitors of different voltage ratings; and a control circuit configured to coordinate control of the BFC and the HBCC for operation at a low line AC input and a high line AC input.

The BFC comprises a sampling and scaling circuit for sensing the peak AC input voltage and providing a voltage feedback signal $V_{FB}$ to the PFC controller to regulate Vdc to a first value for a low line AC input in a range below a threshold value and to regulate Vdc to a second value for high line AC input in a range above the threshold value. The plurality of capacitors of the HBCC comprising a high voltage capacitor $C_{bus\_HV}$ rated for the high line AC input range and a low voltage capacitor $C_{bus\_LV}$ rated for the low line AC input range. $C_{bus\_HV}$ is connected for operation with low line and high line AC input and a capacitor switching circuit for connecting $C_{bus\_LV}$ for operation for low line AC input in response to a sense voltage received from the BFC indicative of low line AC input below said threshold value.

There is provided a Power Factor Correction (PFC) optimization circuit, the PFC optimization circuit comprising: a Boost Follower Circuit (BFC) for regulating Vdc based on the peak AC input voltage, a Hybrid Bulk Capacitance Circuit (HBCC) comprising a plurality of capacitors of different voltage ratings; and a control circuit configured to coordinate control of the BFC and the HBCC for operation at a low line AC input and a high line AC input.

AC input AC/DC SMPS of example embodiments, such as PD adapters, comprise a step or stepless BFC, a HBCC and a control circuit. The BFC enables a variable PFC output with input AC voltage, which provides improved efficiency of the PFC at low line AC input. The HBCC, with HV and LV capacitors and a capacitor switching circuit, reduces the total volume and size for the bulk capacitors to increase power density.

BRIEF DESCRIPTION OF THE DRAWINGS

FIG. 12 shows data an example solution for an SMPS with BFC and all capacitors rated at 450V;

FIG. 13 shows data an example solution for an SMPS with BFC, HV capacitors rated at 450V and LV capacitors rated at 250V;

FIG. 14 shows some examples of volumes and characteristics of capacitors for existing and proposed solutions; and FIG. 15 shows a table with a Bill of Materials (BOM) comparison.

The foregoing and other features, aspects and advantages of the present invention will become more apparent from the following detailed description, taken in conjunction with the accompanying drawings, of some embodiments of the invention, which description is by way of example only.

DETAILED DESCRIPTION

Figure 1:
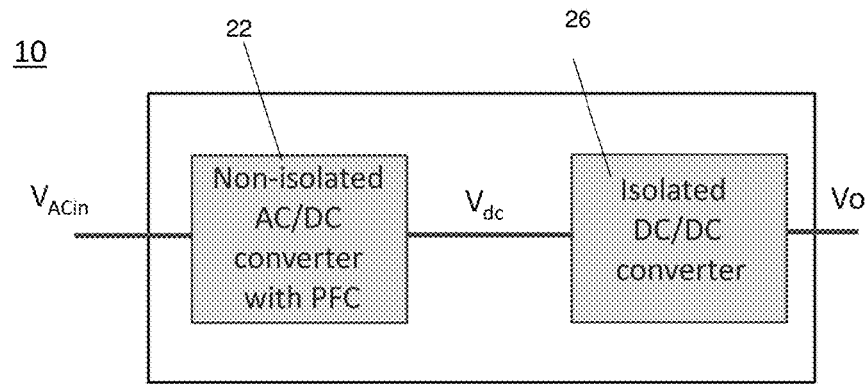
FIG. 1 shows a simplified functional block diagram for an AC input AC/DC Switching Mode Power Supply comprising a non-isolated AC/DC converter with PFC and an isolated DC/DC converter.

As illustrated schematically in the simplified block diagram in FIG. 1, an AC input AC/DC SMPS 10, may comprise, for example, a first stage 22 comprising an AC input PFC stage which receives input AC voltage $V_{inAC}$ and provides an output bus voltage Vdc, and a second stage 26 comprising an electrically isolated DC/DC converter to provide a required output DC voltage $V_{outDC}$ to one or more output ports.

Figure 2:
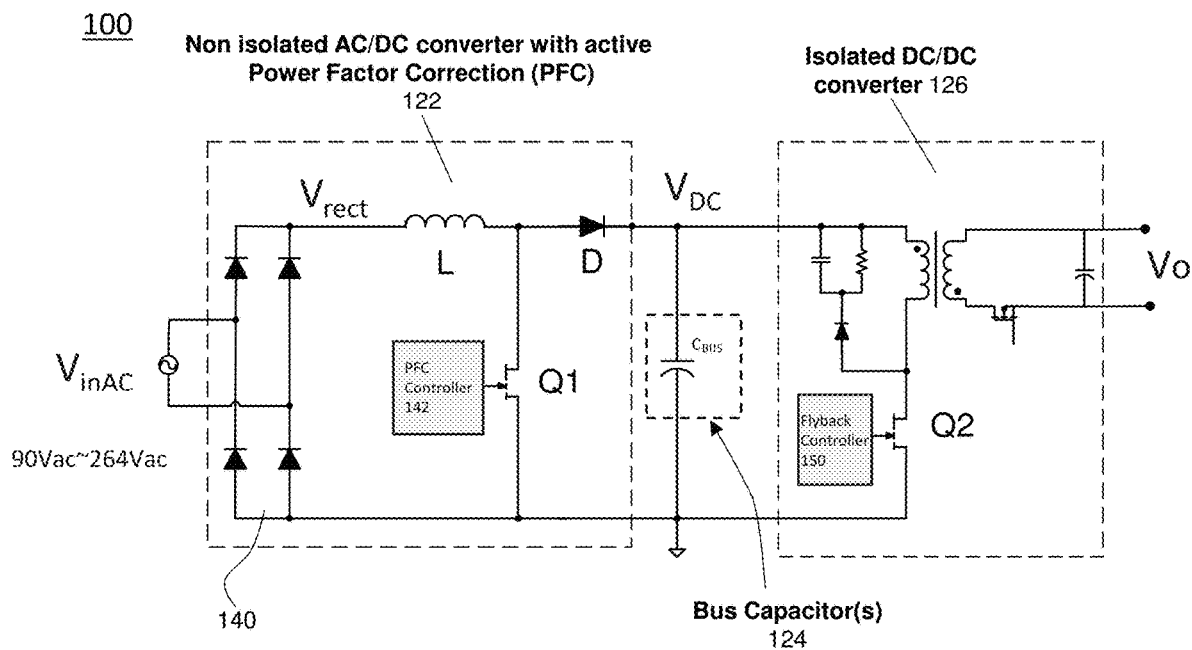
FIG. 2 (Prior Art) shows a simplified functional block diagram for an AC/DC Switching Mode Power Supply (SMPS) comprising a diode bridge boost PFC stage and a Flyback DC/DC converter stage.

A typical architecture for a conventional SMPS comprising an AC/DC power converter 100 with power factor correction, is shown in FIG. 2. The first stage 122 is a power factor correction (PFC) circuit comprising a diode bridge rectifier with active power factor correction comprising a boost inductor L1, a diode D and a transistor switch Q1, which is controlled by PFC controller 142. The power factor correction circuit has inputs for receiving an AC input voltage $V_{inAC}$, and outputs a DC voltage $V_{DC}$ which is above the peak line input voltage, for charging a bulk capacitance, e.g. bus capacitor $C_{bus}$ 124. For example, for a universal AC/DC power delivery adapter, where $V_{inAC}$ may be in a range from ~90$V_{AC}$ to ~260$V_{AC}$, $V_{DC}$ may typically be set at a fixed voltage, e.g. ~390V. This topology may be referred to as a boost (step-up) converter because the $V_{dc}$ (or $V_{boost}$) is higher than the peak line input voltage. The second stage 126 is an isolated DC/DC converter such as a single ended Flyback converter, e.g. Quasi Resonant (QR) Flyback converter, controlled by transistor switch Q2 and Flyback controller 150, which converts $V_{DC}$ to an output voltage $V_{out}$. QR Flyback converter topology is widely used in adapter circuit because it is economical and reliable. Flyback converters provide good efficiency and power density (W/in³) and can operate with a wide range of input and output voltages.

On the other hand, in this power converter architecture, because $V_{DC}$ is fixed at 390V, the losses of the PFC inductor and Q1 are larger, resulting in lower efficiency, particularly at low AC input voltage. The PFC operates (is on) under all loading conditions, and the efficiency at light load is lower due to additional losses on the PFC stage for the inductor L1, switch Q1 and diode D.

When the DC voltage $V_{DC}$ is fixed at ~390V losses of the PFC inductor L and switch Q1 are larger, resulting in lower efficiency for both AC input voltages $V_{inAC}$ of 110 Vac and 230 Vac. Also the bus capacitor(s) must be rated for the peak AC input voltage. For example, the bus capacitance comprises one or more capacitors which have a voltage rating of ~450V and which provides sufficient capacitance for low line input, i.e. has a large capacitance and a large volume.

Using GaN transistors for Q1 and Q2, instead of silicon power transistors provides several advantages. Compared to silicon MOSFETs, GaN transistors have lower on-resistance, higher breakdown voltage, no reverse-recovery characteristics. GaN devices have much lower switching losses, so they can operate at higher switching frequencies. For example, in a low power Universal AC/DC adapter for consumer electronics, which use GaN devices, higher switching frequencies allow for the use of smaller capacitors and inductors, which can significantly reduce the power converter size, weight and cost.

Figures 3, 4:
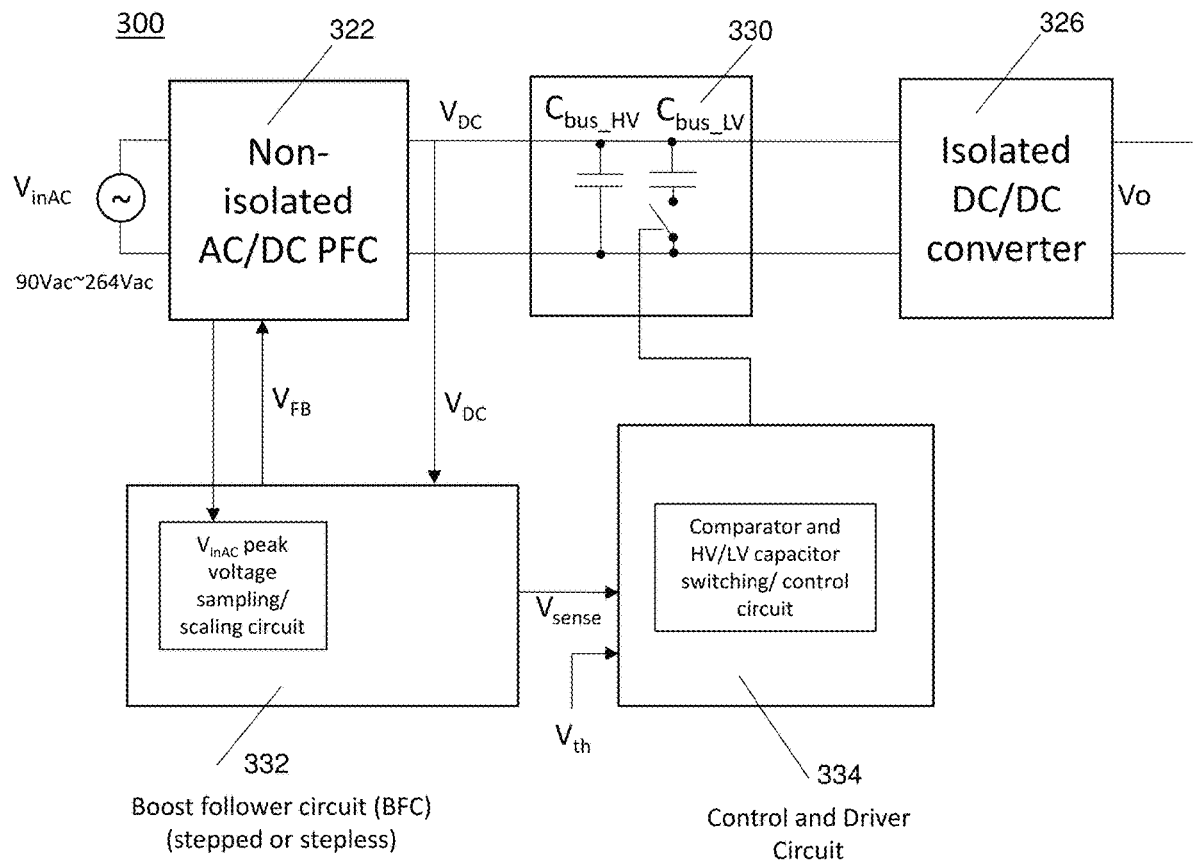
FIG. 3 shows a simplified functional block diagram of a power stage for an AC/DC SMPS with active PFC, a Boost Follower Circuit (BFC), a hybrid bulk capacitor circuit (HBCC), and control and driver circuit, for example embodiments.
FIG. 4 shows equations for computing capacitor values based on hold-up time and ripple voltage.

A schematic block diagram of an AC input AC/DC SMPS 300 of an example embodiments comprising a non-isolated AC/DC converter with active PFC 322, a boost follower circuit (BFC) 332 and a hybrid bulk capacitance circuit (HBCC) 330, and a second stage 326 comprising an isolated DC/DC converter, and a control and driver circuit 334 is shown in FIG. 3.

As described in the above referenced U.S. patent application Ser. No. 17/230,390, filed Apr. 14, 2021, entitled "Hybrid Bulk Capacitance Circuit for AC Input AC/DC Switching Mode Power Supplies" the bulk capacitors take up a significant volume and a hybrid bulk capacitance circuit comprising high voltage (HV) capacitors and low voltage (LV) and a capacitor switching circuit can be used to reduce the total capacitor volume.

The AC/DC converter efficiency of the PFC can be increased by decreasing the average PFC output voltage Vdc, using a boost follower circuit to follow the line voltage. The increased efficiency results from reducing the switching loss of switch Q1 of the PFC stage. The boost follower circuit BFC includes a peak voltage sampling and scaling circuit, that samples and scales the peak input voltage and provides a voltage feedback signal $V_{FB}$ to the PFC controller and provides a voltage feedback signal Vsense to the capacitor switching circuit of the HBCC. The BFC enables the PFC to regulate the DC bus voltage $V_{dc}$ dependent on the AC input voltage. When the average PFC output voltage $V_{dc}$ is decreased, the minimum bus capacitance needs to be increased to meet the same hold-up time and ripple voltage requirements. There is a significant difference between the minimum bus capacitance requirements for low line AC input and high line AC inputs. In a HBCC, the bus capacitance comprises a high voltage capacitor $C_{bus\_HV}$, which is always connected and a low voltage capacitor $C_{bus\_LV}$, which is switchably connected in parallel with $C_{bus\_HV}$, controlled by a comparator and a HV/LV capacitor switching/control circuit of the control and driver circuit, dependent on the sensed $V_{inAC}$ peak voltage. Values of capacitors $C_{bus\_HV}$ and $C_{bus\_HV}$ are selected to meet requirements for hold-up time and/or ripple voltage for high line AC input and for low line AC input.

FIG. 4 shows equations for computing capacitor values based on hold-up time and ripple voltage.

Figure 5:
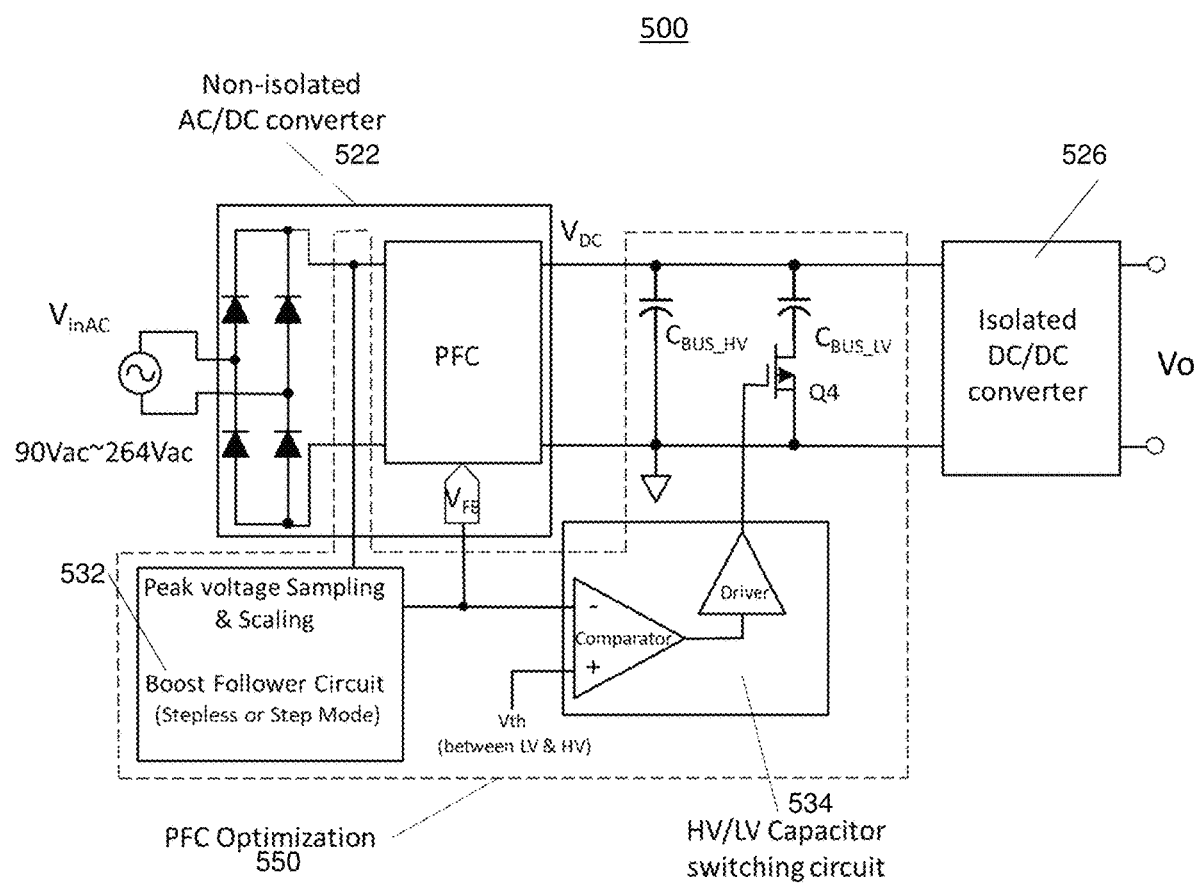
FIG. 5 shows a simplified functional block diagram of an architecture for a power stage for an AC/DC SMPS of example embodiments comprising a non-isolated AC/DC converter with PFC, an isolated DC/DC converter, and PFC Optimization Circuit which comprises a Boost Follower Circuit (BFC) and a hybrid bulk capacitor circuit (HBCC) with a HV/LV capacitor switching circuit.

FIG. 5 shows a simplified functional block diagram of a SMPS 500 of an example embodiment wherein non-isolated AC/DC PCF stage 522 is a bridge diode boost PFC stage. A peak voltage sampling and scaling circuit of the BFC circuit 532 provides a voltage feedback signal $V_{FB}$ to the PFC controller 523, and to the HV/LV capacitor switching circuit 534. In the HV/LV capacitor switching circuit 534 the voltage feedback signal $V_{FB}$ is compared with a reference signal Vth, which sets a threshold value between a low line AC input voltage (LV range) and a high line AC input voltage range (HV range). The output of the comparator in the HV/LV capacitor switching circuit 534 is provided to the driver for transistor switch Q4, for switching between HV and LV modes, using Cbus=$C_{bus\_HV}$ only for a high line AC input and using the combined capacitance $C_{bus}$ HV+$C_{bus\_LV}$ for low line AC input. The PFC optimization 550 includes the BFC circuit 532, the HV/LV capacitor switching circuit 534, transistor switch Q4 and the capacitors $C_{bus\_HV}$ and $C_{bus\_HV}$. The BFC circuit 532 includes the peak voltage sampling and scaling circuit.

Figure 6:
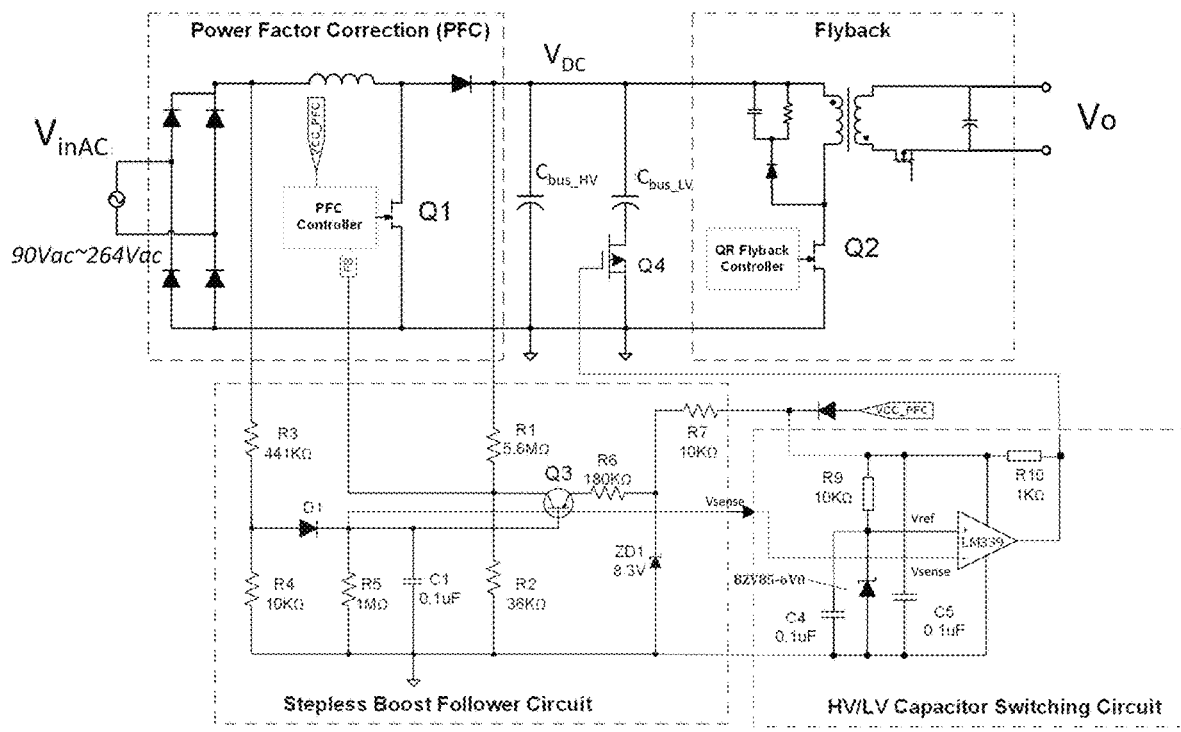
FIG. 6 shows a circuit schematic for a power stage comprising an AC/DC SMPS of a first example embodiment comprising a stepless BFC.

FIG. 6 shows an AC input AC/DC SMPS of a first example embodiment which comprises PFC optimization using a stepless BFC. Example circuit implementations for the stepless BFC and the HV/LV capacitor switching circuit are shown. When the AC input is low line (e.g. <160 Vac): Q4 turned on, the DC bus voltage is regulated to $V_{DC}$=230V, and the bus capacitance $C_{BUS}$=$C_{BUS\_LV}$+$C_{BUS\_HV}$. When the AC input is high line (e.g. >180 Vac): Q4 is turned off, the DC bus voltage is regulated to $V_{DC}$=380V, and the bus capacitance $C_{BUS}$=$C_{BUS\_HV}$.

The operation of the stepless BFC is described with reference to FIG. 6. Resistors R1 and R2 form a resistive divider to sense the PFC output voltage of PFC, Vdc. Resistors R3 and R4, capacitor C1 and diode D1 are used to sense the AC input peak voltage, i.e. from $V_{rect}$. The bias current $i_{bias}$ inversely proportional to the AC peak voltage through the transistor Q3, resistor R6, and Zener diode ZD1, which provides a bias voltage. The feedback signal FB is formulated together with $V_{dc}$ and the AC input voltage. The PFC output voltage $V_{dc}$ is equal to:

$$Vdc = \left(\frac{Vref}{R2} - i_{bias}\right) \times R1 + Vref$$

In this example embodiment, $V_{ref}$ is 2.5V, R2=36 k$\Omega$, and R1=5.6 M$\Omega$.

The BFC of the embodiment illustrated in FIG. 6 is designed to provide fast sensing of the AC input voltage, using the voltage divider R3 and R4, and the diode D1 and a very small capacitor C1, e.g. 0.1 µF, for fast sensing the peak voltage of $V_{rect}$. The BFC also receives the supply voltage Vcc_PFC, so that the BFC will turn on and off in response to supply voltage Vcc_PFC to the PFC. Since the PFC and the BFC are controlled by the same supply voltage Vcc_PFC, that means that, if the PFC is on, the BFC is on, and when PFC is off, the BFC is off. Also, in this embodiment, a Zener diode is used to regulate VCC_PFC to a bias voltage of BFC e.g. 8.3V, so that the BFC can be used to provide an appropriate feedback voltage, FB to the PFC controller. This means that the BFC circuit of this embodiment is designed to provide a feedback voltage FB in a range that is applicable for control of a range of different PFC controllers, without using an internal reference voltage of the PFC controller for the bias voltage. So, the values of R3, R4, C1 and R6 of the BFC of the example embodiment are selected so that the BFC can be applicable to different PFC controllers, if AC input voltage $V_{inAc}$ is a universal input in the range from 90V to 264V. The BFC of the example embodiment shown in FIG. 6 therefore provides more flexibility to be generic to interface to any suitable PFC controller, by using an external bias voltage Vbias (e.g. 8.3V from the Zener diode), and provides fast, instantaneous, sensing of the AC voltage input for real-time control.

Figure 7:
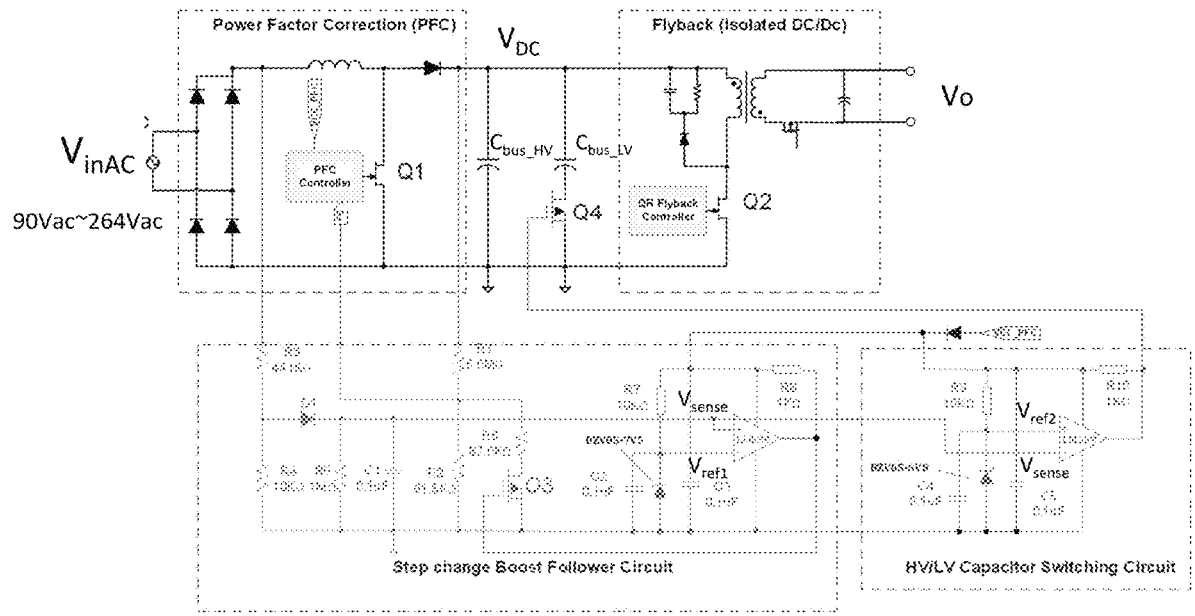
FIG. 7 shows a circuit schematic for a power stage comprising an AC/DC SMPS of a second example embodiment comprising a step BFC.

FIG. 7 shows an AC input AC/DC SMPS of a second example embodiment which comprises PFC optimization using a step change BFC and a HV/LV capacitor switching circuit. The DC bus voltage is decided by the voltage divider (Rlowside and Rhighside) as $$Vdc = \frac{Rlowside + Rhighside}{Rlowside} \times Vref1,$$

Vref1 is a constant voltage (can be clamped by a Zener diode, shown as BZV85-7V5 in FIG. 7). When the AC line input is low (e.g. <160 Vac): Q3 is off, R6 is open, Rlowside=R2, Q4 is on, the DC bus voltage is regulated to $$V_{DC} = \frac{R2 + R1}{R2} \times Vref1 = 230 \text{ V},$$

and the bus capacitance $C_{Bus}$=$C_{Bus\_LV}$. When AC line input is high (e.g. >180 Vac): Q3 on, R6 is in paralleled with R2, $$Rlowside = \frac{R2 \times R6}{R2 + R6},$$

Figure 8:
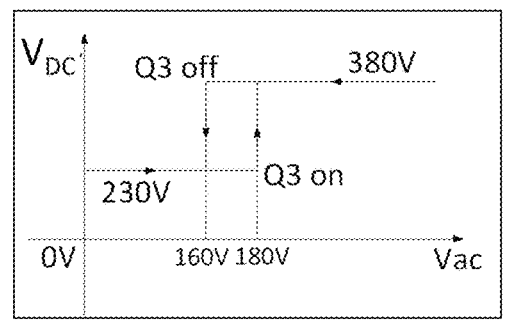
FIG. 8 shows a schematic diagram to illustrate hysteresis control.

Q4 off, the DC bus voltage is regulated to $$V_{DC} = \frac{\frac{R2 \times R6}{R2 + R6} + R1}{\frac{R2 \times R6}{R2 + R6}} = 380 \text{ V},$$

and $C_{BUS}$=$C_{BUS\_HV}$. Hysteresis control is required for switching Q3 on and off, to control $R_{lowside}$. Hysteresis control is illustrated by the schematic diagram in FIG. 8.

Figure 9A:
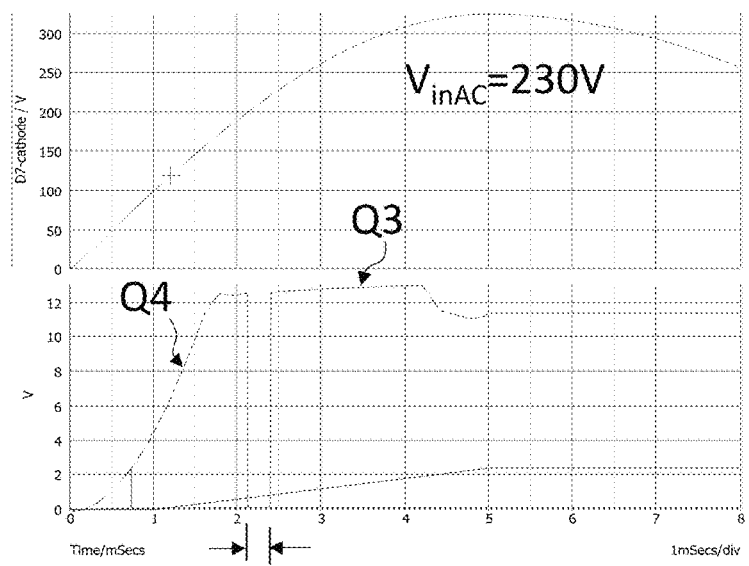
FIGS. 9A and 9B shows some simulation results to illustrate operation of the AC/DC SMPS of the second example embodiment using a step regulation mode for high line AC input and for low line AC input.
Figure 9B:
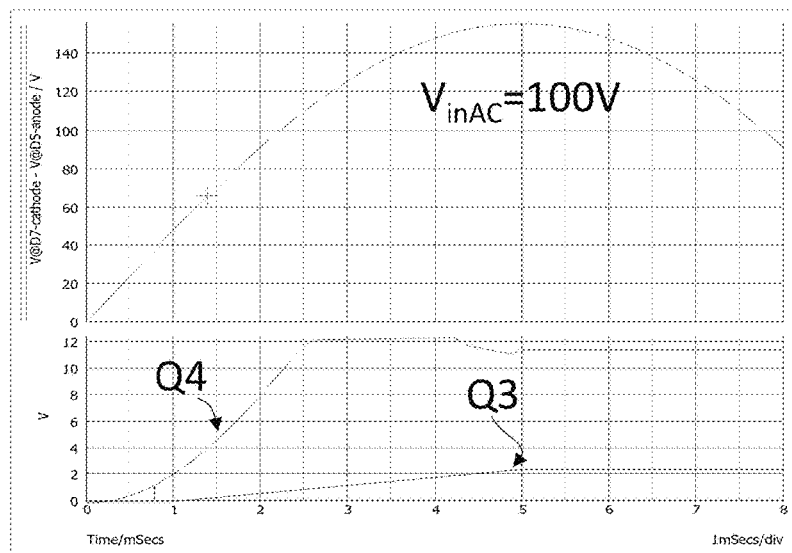

FIGS. 9A and 9B show some simulation results for the step regulation mode to illustrate switching of transistors Q3 and Q4. FIG. 9A shows when AC line input is high (e.g. greater than 180 Vac), Q3 is turned on and Q4 is turned off. As shown in FIG. 9A, in the example simulation results there is a small deadtime between switching of transistors Q4 and Q3. FIG. 9B shows when AC line input is low (e.g. less than 160 $V_{ac}$), Q3 is off and Q4 is on. Q3 is kept off to keep the LV bus voltage reference and Q4 is on to enable the LV bus capacitance.

Figure 10:
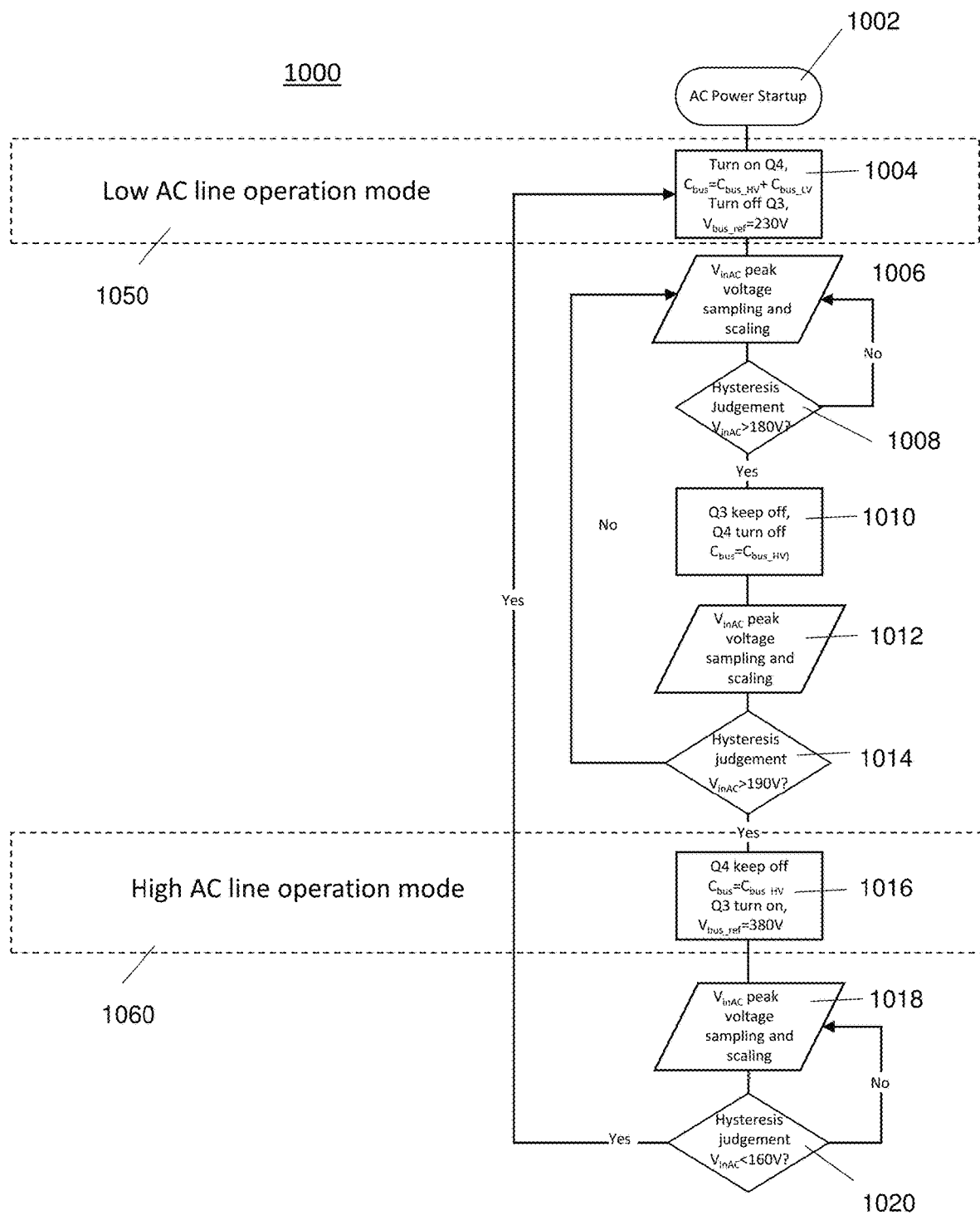
FIG. 10 shows a flow chart to illustrate some steps of a method of operating the AC/DC SMPS of the second example embodiment, comprising a low AC line operation mode and a high AC line operation mode.

FIG. 10 shows a flow chart to illustrate some steps of a method 1000 of operating the AC/DC SMPS of the second example embodiment, using a step regulation mode, comprising a low AC line operation mode 1050 and a high AC line operation mode 1060. At AC power start-up 1002, the AC/DC SMPS operates in the low AC line operation mode 1050. The switching transistor Q4 is on, the bus capacitance $C_{Bus}=C_{Bus}+C_{BUS\_LV}$, switching transistor Q3 is off, and $V_{bus\_ref}=230V$ (block 1004). Next, the AC/DC SMPS receives the input $V_{inAC}$, and it is sampled and scaled (block 1006). Then it is determined if $V_{inAC}$ peak voltage is greater than 180V (block 1008). If no, then the method returns to block 1006 to sample and scale the $V_{inAC}$ peak voltage. If yes, then switching transistor Q3 is kept off, switching transistor Q4 is turned off, and $C_{BUS}=C_{BUS\_HV}$ (block 1010). Next, the input $V_{inAC}$, is again sampled and scaled (block 1012) and it is determined if $V_{inAC}$ peak voltage is greater than 190V (block 1014). If no, then the method returns to block 1006 to sample and scale the $V_{inAc}$ peak voltage. If yes, then switching transistor Q4 is kept off, switching transistor Q3 is turned on, $C_{BUS}=C_{BUS\_HV}$ and $V_{bus\_ref}=380V$ so that the AC/DC SMPS operates at high AC line operation mode (block 1016). The input $V_{inAC}$, is sampled and scaled (block 1018) and it is determined if $V_{inAC}$ peak voltage is less than 160V (block 1020). If no, then the method returns to block 1018 to sample and scale the $V_{inAC}$ peak voltage. If yes, then the method returns to block 1004 and switching transistor Q4 is turned on, the bus capacitance $C_{BUS}=C_{BUS\_HV}+C_{BUS\_LV}$, switching transistor Q3 is turned off, and $V_{bus\_ref}=230V$.

A PFC optimization circuit is thus provided between a universal AC input power factor correction stage output and an DC/DC converter stage input. The PFC voltage is variable with input voltage, controlled by a BFC, so that at high line AC input, e.g. 160 Vac~264 Vac, the PFC output bus voltage Vdc is e.g. around 380V and at low line AC input, e.g. 90 Vac~160 Vac, the PFC output bus voltage Vdc is e.g. around 230V. An HBCC comprising multiple capacitors having different voltage ratings and a capacitor switching circuit, which includes a comparator drive circuit controlling the switching of the capacitors, for operation at high line AC input and for operation with low line AC input. This architecture results in improved efficiency at low line AC input, and reduces the total system volume and height, to increase power density. The control circuit coordinates operation of the BFC and HBCC for operation at low line AC input and for operation at high line AC input.

Figure 11:
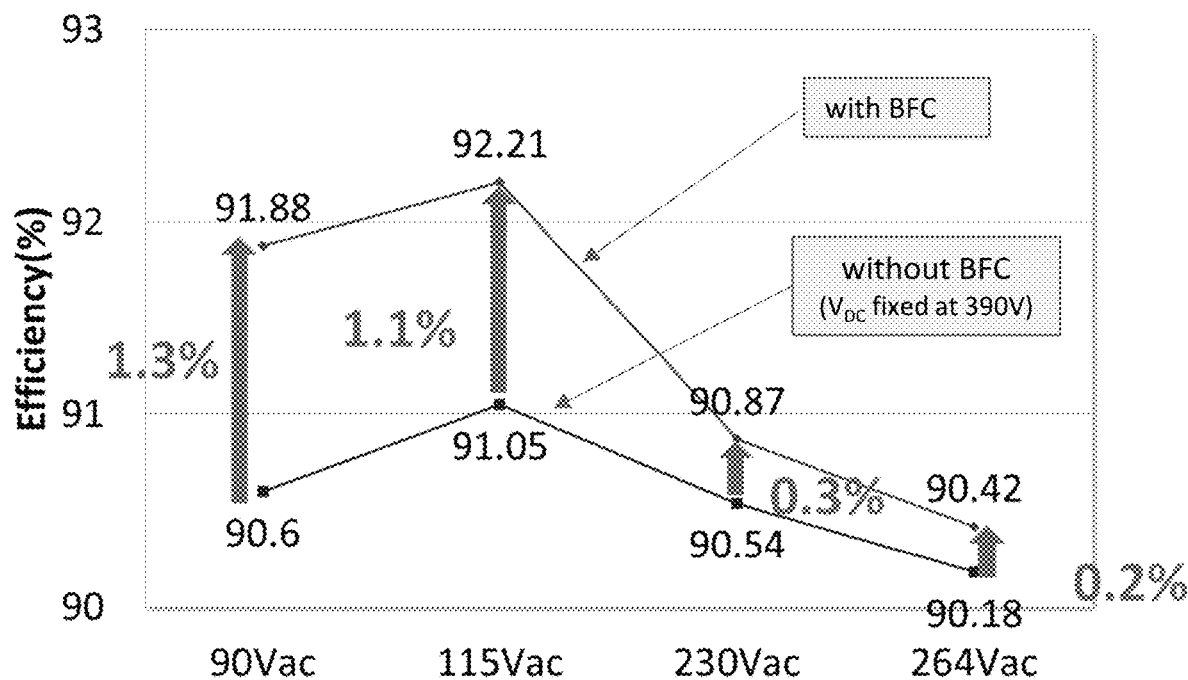
FIG. 11 shows some plots to compare average efficiency of an example 100 W 2×USB-C port PD adapter for different AC input voltages $V_{AC}$.

FIG. 11 shows some plots to compare average efficiency of an example 100 W 2×USB-C port PD adapter for different AC input voltages $V_{AC}$.

FIG. 12 shows data an example solution for an SMPS with BFC and all capacitors rated at 450 V, which based on ripple voltage and hold-up time requirements, the required bus capacitance is 82 µF rated for 450V. FIG. 13 shows data an example solution for an SMPS with BFC and HBCC, which based on ripple voltage and hold-up time requirements requires a HV capacitor of 47 µF rated at 450V and a LV capacitor of 47 µF rated at 250V. For a power supply unit, both ripple voltage and hold-up time need to be considered. For a power adapter, or LED driver, for example, only ripple voltage needs to be considered.

Example data shown in FIGS. 14 and 15, illustrate how the volume and cost of the AC/DC adapter can be reduced by using capacitors of different voltage ratings and smaller volume. FIG. 14 lists some examples of volumes and characteristics of capacitors to compare a conventional arrangement where all capacitors are selected to meet a maximum voltage rating, and a hybrid bulk capacitance circuit of an example embodiment. For example, where a conventional arrangement requires a total bulk capacitance of ~100 g, for a maximum voltage rating of >373V, e.g. capacitors with a voltage rating of 400V, two bulk capacitors are selected to be 82 g and 22 g. 104 uF is the minimum capacitance value required to keep the output of AC/DC charger regulatable. It is also acceptable to use two equal capacitators, e.g. two 56 g 400V capacitors in parallel. However, the total volume will be higher than the combination of 82 µF and 22 g. For the hybrid bulk capacitance circuit of the embodiment comprising two capacitors, the first capacitor calculation shows that, to provide the capacitance value need for HV operation, a 47 µF capacitor, voltage rated at >373V, e.g. 400V is required. For LV operation, an additional 47 g capacitor is required, but this needs to be voltage rated at only >226V, e.g. 250V. This combination of capacitors meets the requirements of a total capacitance of close to 100 g for lower voltage range operation, when both capacitors are connected. And for higher voltage range operation, only the 47 g, 400V rated capacitor is connected.

FIG. 15 shows a table with a Bill of Materials (BOM) comparison. In this example, a hybrid bulk capacitance circuit, which enables selection of one or more bulk capacitors responsive to the input AC voltage, results in a potential capacitor volume reduction of about 23% and an estimated cost reduction of about 7%. This translates to a system volume reduction of e.g. at least 8%. Because two smaller separate capacitors allow for increased flexibility of the component layout, e.g. with closer packing of components, an arrangement of multiple bulk capacitors as disclosed herein facilitates achieving an AC/DC charger with a higher power density. For example, the transformer height and/or capacitor height (diameter) may contribute significantly to the uncased volume. The transformer size and height may be reduced by splitting it into two smaller transformers, or using planar transformer designs. Since the capacitors are usually mounted sideways, providing smaller diameter capacitors (e.g. 12.5 mm diameter vs. 18 mm diameter per example in FIG. 15) potentially allows for a lower profile layout, with reduced uncased height, enabling compact low-profile designs, with higher power density.

In the HBCC, the high voltage capacitance Cin_HV may comprise one capacitor, or more than one capacitor in parallel, selected to provide the required capacitance value, while minimizing the capacitor volume. Correspondingly, the low voltage capacitance Cin_LV may comprise one capacitor or more than one capacitor in parallel, selected to provide a required capacitance value, while minimizing the capacitor volume. If the low voltage capacitance Cin_LV comprises more than one capacitor, these may be individually switched, so that a first low voltage capacitor can be connected when the sensed AC input voltage is below a first threshold voltage, and a second low voltage capacitor can be connected when the sensed AC input voltage is below a second threshold voltage.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. An AC input AC/DC Switching Mode Power Supply (SMPS) comprising:
   a first stage that is a power factor correction stage, the power factor correction stage configured to receive an AC input voltage from an input of the first stage and provide a DC bus voltage on an output node of the first stage, the power factor correction stage comprising a non-isolated AC/DC converter and a power factor correction controller;
   a second stage comprising an isolated DC/DC converter that is configured to receive the DC bus voltage and provide an output voltage;
   a boost follower circuit configured to regulate the DC bus voltage based on a peak AC input voltage,
   a hybrid bulk capacitance circuit comprising a plurality of capacitors of different voltage ratings each of which having one end connected directly to the output node of the first stage; and
   a control circuit configured to coordinate control of the boost follower circuit and the hybrid bulk capacitance circuit for operation at a low line AC input and a high line AC input, such that the DC bus voltage is lower at the low line AC input than at the high AC line input by controlling operation of the power factor correction controller, and such that a capacitance of the hybrid bulk capacitance circuit is higher at the lower line AC input than at the high AC line input by controlling a total capacitance of the hybrid bulk capacitance circuit.

2. The AC input AC/DC Switching Mode Power Supply (SMPS) of claim 1, wherein:
   the boost follower circuit comprises a sampling and scaling circuit for sensing the peak AC input voltage and providing a voltage feedback signal to the power factor correction controller to regulate the DC bus voltage to a first value for the low line AC input in a range below a first threshold value and to regulate the DC bus voltage to a second value for high line AC input in a range above a second threshold value;
   the plurality of capacitors of the hybrid bulk capacitance circuit comprising a high voltage capacitor rated for the high line AC input range and a low voltage capacitor rated for the low line AC input range; and
   the high voltage capacitor being connected for operation within the low line AC input range and within the high line AC input range, a the low voltage capacitor for operation within the low line AC input range, but not within the high line AC input range,
   the AC input AC/DC Switching Mode Power Supply further comprising a switching circuit configured to respond to a sense voltage received from the boost follower circuit to control the hybrid bulk capacitance circuit such that the low voltage capacitor operates in the low line AC input range but not in the high line AC input range.

3. The AC input AC/DC Switching Mode Power Supply (SMPS) of claim 2, wherein the boost follower circuit is a step change boost follower circuit, and wherein said first and second threshold values are different values to induce hysteresis in switching between operation between the low line AC input range and the high line AC input range.

4. The AC input AC/DC Switching Mode Power Supply (SMPS) of claim 2, wherein when the AC input voltage is in the low AC input range, the capacitance of the output node of the first stage is a combination of the capacitance of the high voltage capacitor and the low voltage capacitor.

5. The AC input AC/DC Switching Mode Power Supply (SMPS) of claim 2, wherein when the AC input voltage is in the high AC input range, the bus capacitance is only the capacitance of the high voltage capacitor.

6. The AC input AC/DC Switching Mode Power Supply (SMPS) of claim 2, wherein the first threshold value is 180 Vac, wherein the AC input voltage is in the low AC input range when the AC input voltage is less than 160 Vac.

7. The AC input AC/DC Switching Mode Power Supply (SMPS) of claim 2, wherein the second threshold value is 180 Vac, wherein the AC input voltage is in the high AC input range when the AC input voltage is greater than 180 Vac.

8. The AC input AC/DC Switching Mode Power Supply (SMPS) of claim 1, wherein the boost follower circuit is a stepless boost follower circuit.

9. The AC input AC/DC Switching Mode Power Supply (SMPS) of claim 1, wherein the boost follower circuit stage is a bridge diode boost power factor correction stage.

10. The AC input AC/DC Switching Mode Power Supply of claim 1, the non-isolated AC/DC converter comprising a diode bridge, a boost inductor, a diode, a transistor switch, and the power factor correction controller, the diode bridge configured to receive the AC input voltage and provide a rectified voltage at an output of the diode bridge, the inductor having a first end connected to the output of the diode bridge and a second end connected to an anode of the diode and to a drain terminal of the transistor switch, the transistor switch having a source terminal connected to a fixed low voltage source, and a gate terminal driven by the power factor correction controller, a cathode of the diode being an output of the power factor correction stage, each of the plurality of capacitors of the connected directly to the cathode of the diode.

* * * * *